US012774829B2

(12) United States Patent
Salunkke et al.

(10) Patent No.: US 12,774,829 B2
(45) Date of Patent: *Oct. 27, 2026

(54) SOUND ATTENUATOR FOR A TERMINAL UNIT

(71) Applicant: Tyco Fire & Security GmbH, Neuhausen am Rheinfall (CH)

(72) Inventors: Abhijeet R. Salunkke, Pune (IN); Tarun Dogra, Jhajjar (IN); Sushilkumar D. Gorad, Pune (IN); Parmeshwar G. Patil, Pune (IN); Timothy J. Wilson, St Petersburg, FL (US); Vinothkumar Muthu, Ramanathapuram (IN); Tyler J. Williams, Seminole, FL (US)

(73) Assignee: Tyco Fire & Security GmbH, Neuhausen am Rheinfall (CH)

(*) Notice: Subject to any disclaimer, the term of this patent is extended or adjusted under 35 U.S.C. 154(b) by 188 days.

This patent is subject to a terminal disclaimer.

(21) Appl. No.: 18/439,544

(22) Filed: Feb. 12, 2024

(65) Prior Publication Data

US 2024/0183575 A1 Jun. 6, 2024

Related U.S. Application Data

(63) Continuation of application No. 17/344,529, filed on Jun. 10, 2021, now Pat. No. 11,898,771.

(Continued)

(51) Int. Cl.

*F24F 13/24* (2006.01)
*G10K 11/16* (2006.01)

(52) U.S. Cl.

CPC ............ *F24F 13/24* (2013.01); *G10K 11/161* (2013.01)

(58) Field of Classification Search

CPC ....... F24F 13/24; F24F 1/0033; G10K 11/161

(Continued)

(56) References Cited

U.S. PATENT DOCUMENTS

| | | |
|---|---|---|
| 3,033,307 A | 5/1962 | Sanders et al. |
| 3,511,336 A | 5/1970 | Rink et al. |

(Continued)

FOREIGN PATENT DOCUMENTS

| | | |
|---|---|---|
| CN | 103562562 B | 9/2016 |
| CN | 211345647 U | 8/2020 |

(Continued)

OTHER PUBLICATIONS

English translation of JP 2012246769 A, accessed Oct. 15, 2025 via Espacenet; <https://translationportal.epo.org/emtp/translate/?ACTION=description-retrieval&COUNTRY=JP&ENGINE=google&FORMAT=docdb&KIND=A&LOCALE=en_EP&NUMBER=2012246769&SRCLANG=ja&TRGLANG=en> (Year: 2012).*

(Continued)

*Primary Examiner* — Jeremy A Luks
(74) *Attorney, Agent, or Firm* — Fletcher Yoder, P.C.

(57) ABSTRACT

A terminal unit for a heating, ventilation, and air conditioning (HVAC) system includes a housing defining a plenum and having a first panel and a second panel disposed opposite each other. The first panel has a first outlet opening and a second outlet opening, and the second panel has a first inlet opening configured to receive a first air flow and a second inlet opening configured to receive a second air flow. The terminal unit includes a sound attenuator including an inlet configured to receive the first air flow and an outlet configured to discharge the first air flow into the housing via the first inlet opening. The terminal unit further includes first and second blowers. The first blower is configured to discharge air from the plenum via the first outlet opening, (Continued)

and the second blower is configured to discharge air from the plenum via the second outlet opening.

20 Claims, 10 Drawing Sheets

Related U.S. Application Data

(60) Provisional application No. 63/038,025, filed on Jun. 11, 2020.

(58) Field of Classification Search
USPC .......................................................... 181/224
See application file for complete search history.

(56) References Cited

U.S. PATENT DOCUMENTS

| | | | |
|---|---|---|---|
| 3,748,997 A | 7/1973 | Dean, Jr. et al. | |
| 4,336,863 A | 6/1982 | Satomi | |
| 7,328,586 B2 | 2/2008 | Gau et al. | |
| 8,210,308 B2 | 7/2012 | Penner et al. | |
| 8,453,790 B1 | 6/2013 | Oliver et al. | |
| 9,791,166 B2 | 10/2017 | Rainey et al. | |
| 11,898,771 B2 * | 2/2024 | Salunkke | F24F 13/20 |
| 2019/0170383 A1 | 6/2019 | Weinert | |

FOREIGN PATENT DOCUMENTS

| | | |
|---|---|---|
| IE | S66502 B2 | 1/1996 |
| JP | 2012246769 A | 12/2012 |
| JP | 2013185737 A | 9/2013 |
| JP | 5641125 B2 | 12/2014 |

OTHER PUBLICATIONS

Esaplling pvt ltd: Sound Attenuators for HVAC System !!, Dec. 23, 2017, 2 pages, http://esaplling.blogspot.com/2017/12/sound-attenuators-for-hvac-system.html.

* cited by examiner

SOUND ATTENUATOR FOR A TERMINAL UNIT

CROSS REFERENCE TO RELATED APPLICATIONS

This application is a continuation of U.S. patent application Ser. No. 17/344,529, entitled "SOUND ATTENUATOR FOR A TERMINAL UNIT," filed Jun. 10, 2021, which claims priority from and the benefit of U.S. Provisional Application No. 63/038,025, entitled "VARIABLE AIR VOLUME UNIT FOR AN HVAC SYSTEM," filed Jun. 11, 2020, each of which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Heating, ventilation, and air conditioning (HVAC) systems are generally configured to provide temperature controlled air to an internal space. For example, in certain traditional systems, an air flow (e.g., a conditioned air flow) may be provided to a number of variable air volume (VAV) terminal units positioned in various rooms or on various floors of a building. In certain traditional embodiments, the air flow may be additionally or alternatively conditioned at the terminal unit. In general, each terminal unit is configured to distribute the conditioned air flow to the room(s) and/or floor(s) associated with the terminal unit. In certain traditional embodiments, each terminal unit may include multiple blowers. Unfortunately, amounts of air flow direct across each blower within the terminal unit may be unbalanced, and/or the air flow directed through the terminal unit may generate undesirable noise.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a terminal unit for a heating, ventilation, and air conditioning (HVAC) system includes a housing defining a plenum and having a first panel and a second panel disposed opposite the first panel relative to the plenum, where the first panel has a first outlet opening and a second outlet opening, and the second panel has a first inlet opening configured to receive a first air flow and a second inlet opening configured to receive a second air flow. The terminal unit also includes a sound attenuator coupled to the second panel, where the sound attenuator includes an inlet configured to receive the first air flow in a first direction and an outlet configured to discharge the first air flow in the first direction and into the housing via the first inlet opening. The terminal unit further includes a first blower and a second blower disposed within the housing, where the first blower is configured to discharge air from the plenum in the first direction via the first outlet opening, and the second blower is configured to discharge air from the plenum in the first direction via the second outlet opening.

In another embodiment, a heating, ventilation, and air conditioning (HVAC) system includes a terminal unit including a housing having a plurality of panels, where the plurality of panels defines an interior volume of the terminal unit. The terminal unit also includes a first blower disposed within the housing and configured to discharge air via a first outlet formed in a first panel of the plurality of panels and a second blower disposed within the housing and configured to discharge air via a second outlet formed in the first panel of the plurality of panels. The terminal unit further includes a first inlet and a second inlet formed in a second panel of the plurality of panels, where the first inlet is configured to direct a first air flow into the interior volume, and the second inlet is configured to direct a second air flow into the interior volume, and where the second panel is disposed opposite the first panel relative to the interior volume. The terminal unit also concludes a sound attenuator coupled to the second panel at the second inlet, where the sound attenuator is configured to receive the second air flow and direct the second air flow into the interior volume via the second inlet.

In a further embodiment, a terminal unit of a heating, cooling, and air conditioning (HVAC) system, a housing defining a plenum, where the housing includes a panel defining a first inlet configured to direct a first air flow into the plenum and a second inlet configured to direct a second air flow into the plenum. The terminal unit also includes a first blower and a second blower disposed within the housing, a sound attenuator coupled to the panel and configured to receive the first air flow and direct the first air flow into the plenum via the first inlet, a first baffle coupled to the panel on a first side of the first inlet and extending into the plenum, and a second baffle coupled to panel on a second side of the first inlet and extending into the plenum.

BRIEF DESCRIPTION OF THE DRAWINGS

Various aspects of the present disclosure may be better understood upon reading the following detailed description and upon reference to the drawings, in which.

DETAILED DESCRIPTION

Figure 1:
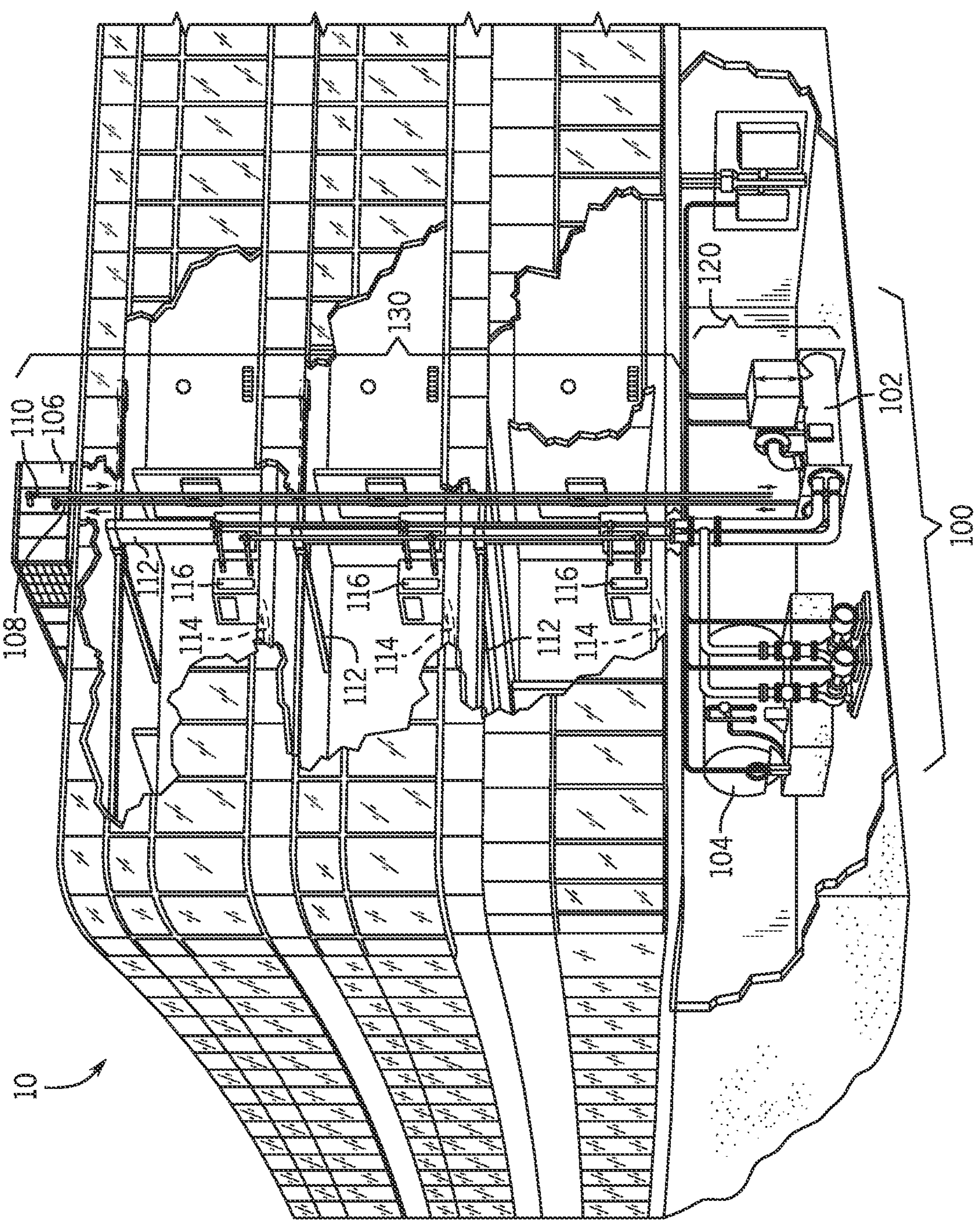
FIG. 1 is a perspective view of an embodiment of a building that may utilize a heating, ventilation, and/or air conditioning (HVAC) system in a commercial setting, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed in further detail below, heating, ventilation, and air conditioning (HVAC) systems are generally configured to provide temperature controlled air to an internal space. For example, in certain traditional systems, an air flow (e.g., a conditioned air flow) may be provided to a number of terminal units positioned in various rooms or on various floors of a building (e.g., within a ceiling of a room). In certain traditional embodiments, the air flow may be additionally or alternatively conditioned at the terminal unit. In general, each terminal unit is configured to discharge the conditioned air flow to the room(s) and/or floor(s) associated with the terminal unit. For example, each terminal unit may discharge air flow via one or more blowers of the terminal unit. A terminal unit may include one or more inlets through which air flows may be received by the terminal unit.

Unfortunately, the arrangement of the inlets in traditional terminal units may produce inefficient (e.g., uneven) air flow within the terminal unit. For example, the air flows may be unevenly directed toward blowers of the terminal unit. In such cases, certain blowers of a multi-blower terminal unit may receive a greater amount of air flow than other blowers. Air flow imbalance between blowers may result in higher blower fan speeds (e.g., higher power consumption), increased pressure losses within the terminal unit, increased noise generation, and/or decreased operating efficiency of the terminal unit.

Accordingly, present embodiments are directed to a terminal unit having an air flow inlet arrangement and a sound attenuator, which are configured to produce improved air flow distribution within the terminal unit. Additionally, the sound attenuator and/or terminal unit may include baffles that extend into an interior volume of the terminal unit to direct air flow more evenly to multiple blowers of the terminal unit. In this way, the present embodiments reduce noise within the terminal unit and increase operational efficiency of the terminal unit.

Referring now to FIG. 1, a perspective view of a building 10 is shown. The building 10 is served by a heating, ventilating, and/or air conditioning (HVAC) system 100. The HVAC system 100 can include a plurality of HVAC devices (e.g., heaters, chillers, air handling units, pumps, fans, thermal energy storage, etc.) configured to provide heating, cooling, air conditioning, ventilation, and/or other services for the building 10. For example, the HVAC system 100 is shown to include a waterside system 120 and an airside system 130. The waterside system 120 may provide a heated and/or chilled fluid to an air handling unit of the airside system 130. The airside system 130 may use the heated and/or chilled fluid to heat or cool an air flow provided to the building 10.

The HVAC system 100 is also shown to include a chiller 102, a boiler 104, and a rooftop air handling unit (AHU) 106. The waterside system 120 may use boiler 104 and chiller 102 to heat and/or cool a working fluid (e.g., water, glycol, etc.) and may circulate the working fluid to the AHU 106. In various embodiments, the HVAC devices of the waterside system 120 can be located in or around the building 10 (as shown in FIG. 1) or at an offsite location, such as a central plant (e.g., a chiller plant, a steam plant, a heat plant, etc.) that serves one or more buildings including the building 10. The working fluid can be heated in the boiler 104 or cooled in the chiller 102, depending on whether heating or cooling is required in the building 10. The boiler 104 may add heat to the circulated fluid, for example, by burning a combustible material (e.g., natural gas) or using an electric heating element. The chiller 102 may place the circulated fluid in a heat exchange relationship with another fluid (e.g., a refrigerant) in a heat exchanger (e.g., an evaporator) to absorb heat from the circulated fluid. The working fluid from the chiller 102 and/or the boiler 104 can be transported to the AHU 106 via piping 108.

The AHU 106 may place the working fluid in a heat exchange relationship with an air flow passing through the AHU 106 (e.g., via one or more stages of cooling coils and/or heating coils). The air flow can be, for example, outside air, return air from within the building 10, or a combination of both. The AHU 106 may transfer heat between the air flow and the working fluid to provide heating or cooling for the air flow. For example, the AHU 106 can include one or more fans or blowers configured to pass the air flow over or through a heat exchanger containing the working fluid. The working fluid may then return to the chiller 102 or the boiler 104 via the piping 110.

The airside system 130 may deliver the air flow supplied by the AHU 106 (i.e., the supply air flow) to the building 10 via air supply ducts 112 and may provide return air from the building 10 to the AHU 106 via air return ducts 114. In some embodiments, the airside system 130 includes multiple variable air volume (VAV) terminal units 116 (e.g., terminal units). For example, the airside system 130 is shown to include separate VAV terminal units 116 on each floor or zone of the building 10. The VAV terminal units 116 can include dampers or other flow control elements that can be operated to control an amount of the supply air flow provided to individual zones of the building 10. In other embodiments, the airside system 130 delivers the supply air flow into one or more zones of the building 10 (e.g., via the air supply ducts 112) without using intermediate VAV terminal units 116 or other flow control elements. The AHU 106 can include various sensors (e.g., temperature sensors, pressure sensors, etc.) configured to measure attributes or parameters of the supply air flow. The AHU 106 may receive input from sensors located within the AHU 106 and/or within the building zone and may adjust the flow rate, temperature, or other attributes of the supply air flow through the AHU 106 to achieve setpoint conditions for the building zone.

Figure 2:
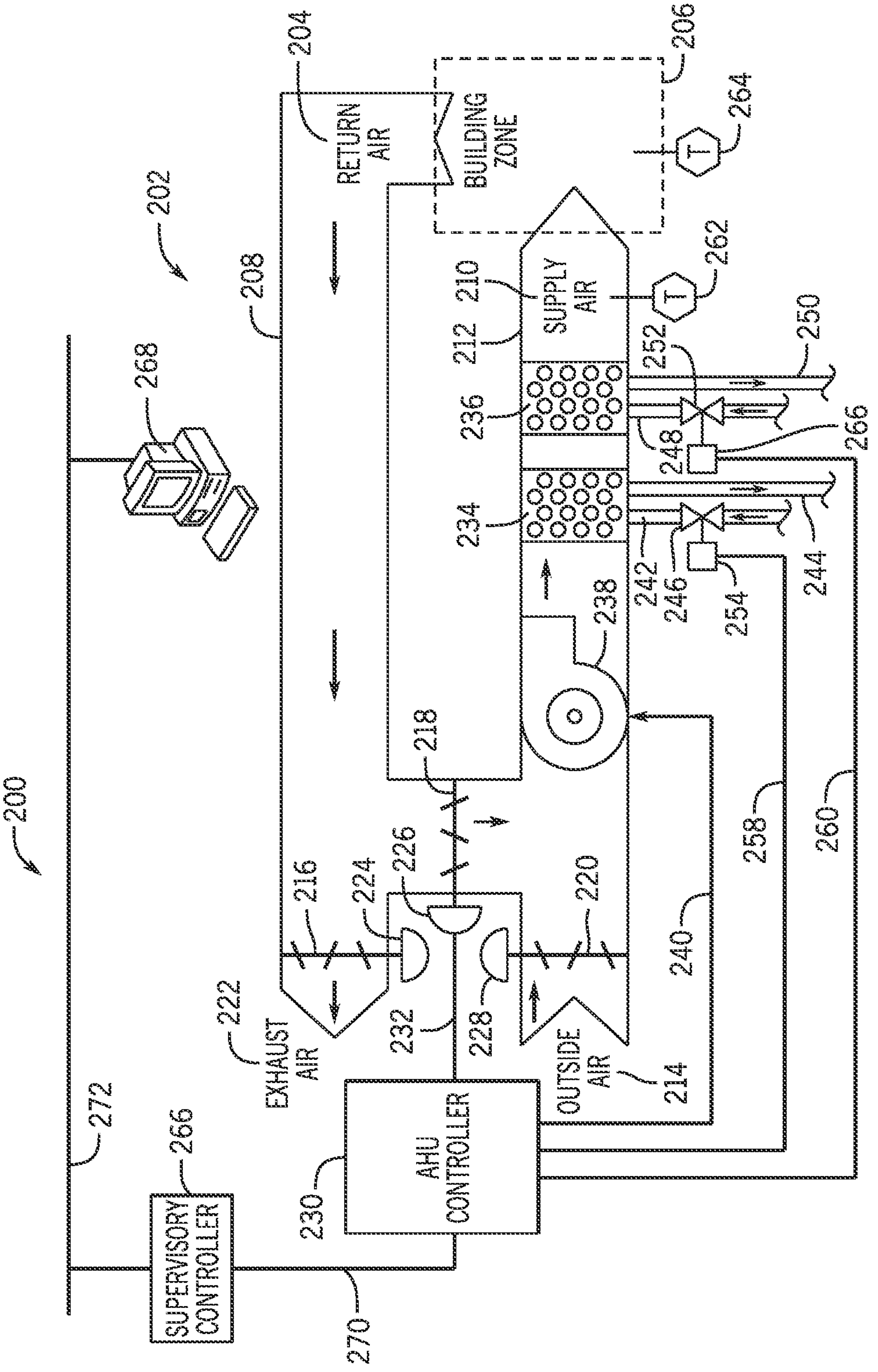
FIG. 2 is a schematic of an embodiment of an airside system including an air handling unit (AHU) of an HVAC system, in accordance with an aspect of the present disclosure.

Referring now to FIG. 2, a block diagram of an airside system 200 is shown, according to some embodiments. In various embodiments, the airside system 200 may supplement or replace the airside system 130 in the HVAC system 100 described above or can be implemented separate from the HVAC system 100. When implemented in the HVAC system 100, the airside system 200 can include a subset of the HVAC devices in the HVAC system 100 (e.g., the AHU 106, the VAV terminal units 116, the ducts 112-114, fans, dampers, etc.) and can be located in or around the building 10. The airside system 200 may operate to heat or cool an air flow provided to the building 10 using a heated or chilled fluid provided by the waterside system 120.

In FIG. 2, the airside system 200 is shown to include an economizer-type air handling unit (AHU) 202. Economizer-type AHUs vary the amount of outside air and return air used by the air handling unit for heating or cooling. For example, an AHU 202 may receive return air 204 from a building zone 206 via a return air duct 208 and may deliver supply air 210 to the building zone 206 via supply air duct 212. In some embodiments, the AHU 202 is a rooftop unit located on the roof of the building 10 (e.g., the AHU 106 as shown in FIG. 1) or otherwise positioned to receive both the return air 204 and outside air 214. The AHU 202 can be configured to operate an exhaust air damper 216, a mixing damper 218, and/or an outside air damper 220 to control an amount of the outside air 214 and the return air 204 that combine to form the supply air 210. Any return air 204 that does not pass through the mixing damper 218 can be exhausted from the AHU 202 through the exhaust damper 216 as exhaust air 222.

Each of the dampers 216-220 can be operated by an actuator. For example, the exhaust air damper 216 can be operated by an actuator 224, the mixing damper 218 can be operated by an actuator 226, and the outside air damper 220 can be operated by an actuator 228. The actuators 224-228 may communicate with an AHU controller 230 via a communications link 232. The actuators 224-228 may receive control signals from the AHU controller 230 and may provide feedback signals to the AHU controller 230. Feedback signals can include, for example, an indication of a current actuator or damper position, an amount of torque or force exerted by the actuator, diagnostic information (e.g., results of diagnostic tests performed by the actuators 224-228), status information, commissioning information, configuration settings, calibration data, and/or other types of information or data that can be collected, stored, or used by the actuators 224-228. The AHU controller 230 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control the actuators 224-228.

Still referring to FIG. 2, the AHU 202 is shown to include a cooling coil 234, a heating coil 236, and a fan 238 positioned within the supply air duct 212. The fan 238 can be configured to force the supply air 210 through or across the cooling coil 234 and/or the heating coil 236 and provide the supply air 210 to the building zone 206. The AHU controller 230 may communicate with the fan 238 via the communications link 240 to control a flow rate of the supply air 210. In some embodiments, the AHU controller 230 controls an amount of heating or cooling applied to the supply air 210 by modulating a speed of the fan 238.

The cooling coil 234 may receive a chilled fluid from the waterside system 120 via piping 242 and may return the chilled fluid to the waterside system 120 via piping 244. A valve 246 can be positioned along the piping 242 or the piping 244 to control a flow rate of the chilled fluid through the cooling coil 234. In some embodiments, the cooling coil 234 includes multiple stages of cooling coils that can be independently activated and deactivated (e.g., by the AHU controller 230, by a supervisory controller 266, etc.) to modulate an amount of cooling applied to the supply air 210.

The heating coil 236 may receive a heated fluid from the waterside system 120 via piping 248 and may return the heated fluid to the waterside system 120 via piping 250. A valve 252 can be positioned along the piping 248 or the piping 250 to control a flow rate of the heated fluid through the heating coil 236. In some embodiments, the heating coil 236 includes multiple stages of heating coils that can be independently activated and deactivated (e.g., by the AHU controller 230, by the supervisory controller 266, etc.) to modulate an amount of heating applied to the supply air 210.

Each of the valves 246 and 252 can be controlled by an actuator. For example, the valve 246 can be controlled by an actuator 254 and the valve 252 can be controlled by an actuator 256. The actuators 254 and 256 may communicate with the AHU controller 230 via communications links 258 and 260. The actuators 254 and 256 may receive control signals from the AHU controller 230 and may provide feedback signals to the AHU controller 230. In some embodiments, the AHU controller 230 receives a measurement of the supply air temperature from a temperature sensor 262 positioned in the supply air duct 212 (e.g., downstream of the cooling coil 234 and/or the heating coil 236). The AHU controller 230 may also receive a measurement of the temperature of the building zone 206 from a temperature sensor 264 located in the building zone 206.

In some embodiments, the AHU controller 230 operates the valves 246 and 252 via the actuators 254 and 256 to modulate an amount of heating or cooling provided to the supply air 210 (e.g., to achieve a setpoint temperature for the supply air 210 or to maintain the temperature of the supply air 210 within a setpoint temperature range). The positions of the valves 246 and 252 affect the amount of heating or cooling provided to the supply air 210 by the cooling coil 234 and/or the heating coil 236 and may correlate with the amount of energy consumed to achieve a desired supply air temperature. The AHU controller 230 may control the temperature of the supply air 210 and/or the building zone 206 by activating or deactivating the coils 234 and 236, adjusting a speed of the fan 238, or a combination of both.

Still referring to FIG. 2, the airside system 200 is shown to include the supervisory controller 266 and a client device 268. The supervisory controller 266 can include one or more computer systems (e.g., servers, supervisory controllers, subsystem controllers, etc.) that serve as system level controllers, application or data servers, head nodes, or master controllers for the airside system 200, the waterside system 120, the HVAC system 100, and/or other controllable systems that serve the building 10. The supervisory controller 266 may communicate with multiple downstream building systems or subsystems (e.g., the HVAC system 100, a security system, a lighting system, waterside system 120, etc.) via a communications link 270 according to like or disparate protocols (e.g., LON, BACnet, etc.). In various embodiments, the AHU controller 230 and the supervisory controller 266 can be separate (as shown in FIG. 2) or integrated with one another. In an integrated implementation, the AHU controller 230 can be a software module configured for execution by a processor of the supervisory controller 266.

In some embodiments, the AHU controller 230 receives information from the supervisory controller 266 (e.g., commands, setpoints, operating boundaries, etc.) and provides information to the supervisory controller 266 (e.g., temperature measurements, valve or actuator positions, operating statuses, diagnostics, etc.). For example, the AHU controller 230 may provide the supervisory controller 266 with temperature measurements from temperature sensors 262 and 264, equipment on/off states, equipment operating capacities, and/or any other information that can be used by the supervisory controller 266 to monitor or control a variable state or condition within the building zone 206.

The client device 268 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the HVAC system 100, its subsystems, and/or devices. The client device 268 can be a computer workstation, a client terminal, a remote or local interface, or any other type of user interface device. In some embodiments, the client device 268 can be a stationary terminal or a mobile device. For example, the client device 268 can be a desktop computer, a computer server with a user interface, a laptop computer, a tablet, a smartphone, a PDA, or any other type of mobile or non-mobile device. The client device 268 may communicate with the supervisory controller 266 and/or the AHU controller 230 via a communications link 272.

Figure 3:
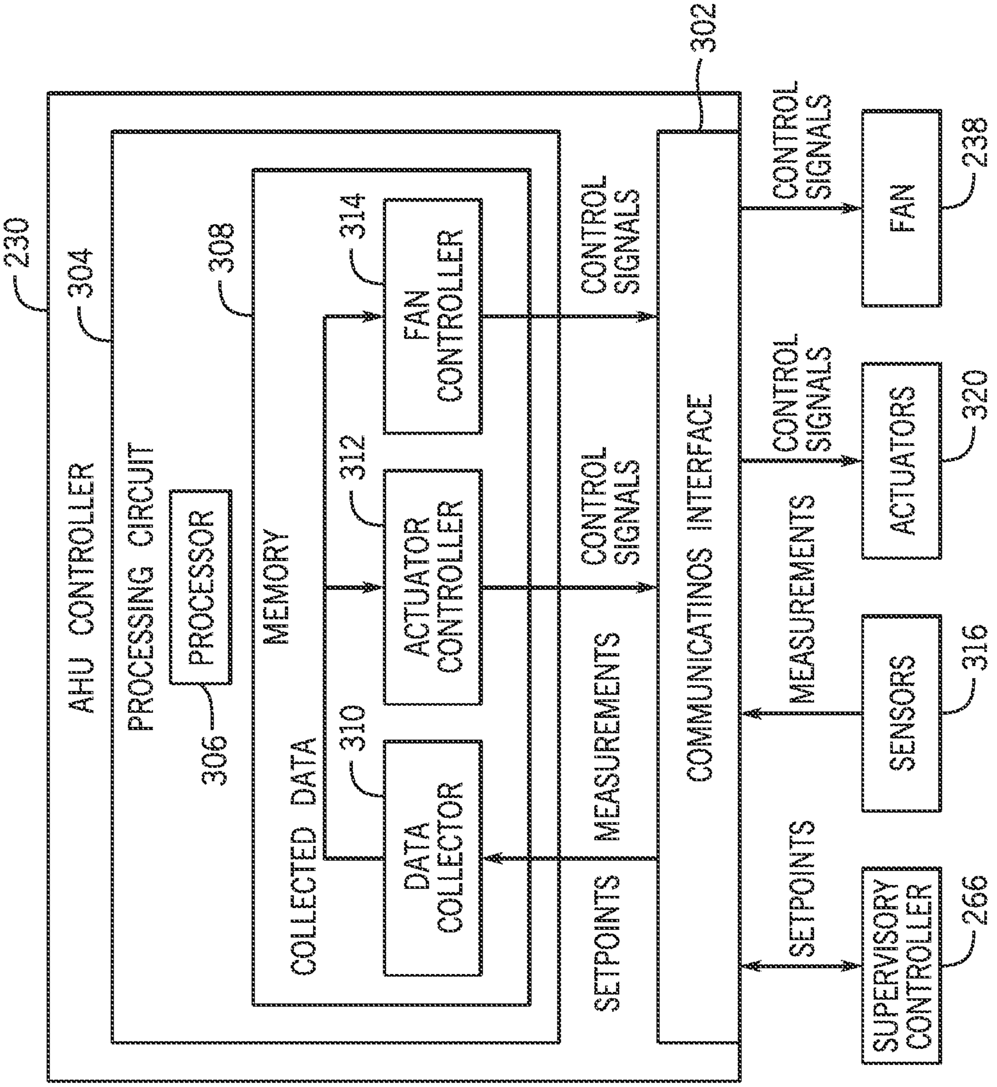
FIG. 3 is a block diagram of an embodiment of an AHU controller configured to monitor and control an AHU of an HVAC system, in accordance with an aspect of the present disclosure.

Referring now to FIG. 3, a block diagram illustrating an embodiment of the AHU controller 230 in greater detail is shown. The AHU controller 230 may be configured to monitor and control various components of the AHU 202 using any of a variety of control techniques (e.g., state-based control, on/off control, proportional control, proportional-integral (PI) control, proportional-integral-derivative (PID) control, extremum seeking control (ESC), model predictive control (MPC), etc.). The AHU controller 230 may receive setpoints from the supervisory controller 266 and measurements from sensors 318 and may provide control signals to actuators 320 and the fan 238. The sensors 318 may include any of the sensors shown in FIG. 2 or any other sensor configured to monitor any of a variety of variables used by the AHU controller 230. Variables monitored by the sensors 318 may include, for example, zone air temperature, zone air humidity, zone occupancy, zone CO2 levels, zone particulate matter (PM) levels, outdoor air temperature, outdoor air humidity, outdoor air CO2 levels, outdoor air PM levels, damper positions, valve positions, fan status, supply air temperature, supply air flowrate, or any other variable of interest to the AHU controller 230.

The actuators 320 may include any of the actuators shown in FIG. 2 or any other actuator controllable by the AHU controller 230. For example, the actuators 320 may include the actuator 224 configured to operate the exhaust air damper 216, the actuator 226 configured to operate the mixing damper 218, the actuator 228 configured to operate the outside air damper 220, the actuator 254 configured to operate the valve 246, and the actuator 256 configured to operate the valve 252. The actuators 320 may receive control signals from the AHU controller 230 and may provide feedback signals to the AHU controller 230.

The AHU controller 230 may control the AHU 202 by controllably changing and outputting a control signals provided to the actuators 320 and the fan 238. In some embodiments, the control signals include commands for the actuators 320 to set the dampers 216-220 and/or the valves 246 and 252 to specific positions to achieve a target value for a variable of interest (e.g., supply air temperature, supply air humidity, flow rate, etc.). In some embodiments, the control signals include commands for the fan 238 to operate a specific operating speed or to achieve a specific air flow rate. The control signals may be provided to the actuators 320 and the fan 238 via a communications interface 302, which is described further below. The AHU 202 may use the control signals an input to adjust the positions of the dampers 216-220 to control the relative proportions of the outside air 214 and the return air 204 provided to the building zone 206.

The AHU controller 230 may receive various inputs via the communications interface 302. Inputs received by the AHU controller 230 may include setpoints from the supervisory controller 266, measurements from the sensors 318, a measured or observed position of the dampers 216-220 or the valves 246 and 252, a measured or calculated amount of power consumption, an observed fan speed, temperature, humidity, air quality, or any other variable that can be measured or calculated in or around the building 10.

The AHU controller 230 includes logic that adjusts the control signals to achieve a target outcome. In some operating modes, the control logic implemented by the AHU controller 230 utilizes feedback of an output variable. The logic implemented by the AHU controller 230 may also or alternatively vary a manipulated variable based on a received input signal (e.g., a setpoint). Such a setpoint may be received from a user control (e.g., a thermostat), a supervisory controller (e.g., supervisory controller 266), or another upstream device via a communications network (e.g., a BACnet network, a LonWorks network, a LAN, a WAN, the Internet, a cellular network, etc.).

The communications interface 302 can be or include wired or wireless communications interfaces (e.g., jacks, antennas, transmitters, receivers, transceivers, wire terminals, etc.) for conducting data communications with various components of the AHU 202 or other external systems or devices. In various embodiments, communications via the communications interface 302 can be direct (e.g., local wired or wireless communications) or via a communications network (e.g., a WAN, the Internet, a cellular network, etc.). For example, the communications interface 302 can include an Ethernet card and port for sending and receiving data via an Ethernet-based communications link or network. In another example, the communications interface 302 can include a Wi-Fi transceiver for communicating via a wireless communications network. In a further example, the communications interface 302 can include a cellular or mobile phone transceiver, a power line communications interface, an Ethernet interface, or any other type of communications interface.

Still referring to FIG. 3, the AHU controller 230 is shown to include a processing circuit 304 having a processor 306 (e.g., processing circuitry) and a memory 308. The processor 306 may be a general purpose or specific purpose processor, an application specific integrated circuit (ASIC), one or more field programmable gate arrays (FPGAs), a group of processing components, or other suitable processing components. The processor 306 is configured to execute computer code or instructions stored in the memory 308 or received from other computer readable media (e.g., CDROM, network storage, a remote server, etc.).

The memory 308 may include one or more devices (e.g., memory units, memory devices, storage devices, etc.) for storing data and/or computer code for completing and/or facilitating the various processes described in the present disclosure. The memory 308 may include random access memory (RAM), read-only memory (ROM), hard drive storage, temporary storage, non-volatile memory, flash memory, optical memory, or any other suitable memory for storing software objects and/or computer instructions. The memory 308 may include database components, object code components, script components, or any other type of information structure for supporting the various activities and information structures described in the present disclosure. The memory 308 may be communicably connected to the processor 306 via the processing circuit 304 and may include computer code for executing (e.g., by the processor 306) one or more processes described herein.

The memory 308 can include any of a variety of functional components (e.g., stored instructions or programs) that provide the AHU controller 230 with the ability to monitor and control the AHU 202. For example, the memory 308 is shown to include a data collector 310 which operates to collect the data received via the communications interface 302 (e.g., setpoints, measurements, feedback from the actuators 320 and the fan 238, etc.). The data collector 310 may provide the collected data to an actuator controller 312 and a fan controller 314 which use the collected data to generate control signals for the actuators 320 and fan 238, respectively. The particular type of control methodology used by the actuator controller 312 and the fan controller 314 (e.g., state-based control, PI control, PID control, ESC, MPC, etc.) may vary depending on the configuration of the AHU controller 230 and can be adapted for various implementations.

As mentioned above, present embodiments are directed to a terminal unit, such as the VAV unit 116, having an air flow inlet arrangement and a sound attenuator, which are configured to improve operation of the terminal unit. For example, the air flow inlet arrangement and the sound attenuator may enable improved air flow distribution within the terminal unit and reduce noise generated by the terminal unit. The terminal unit includes first and second air flow inlets configured to receive respective air flows. The first and second air flow inlets are positioned on a common side of the terminal unit and are configured to direct the air flows towards one or more blowers of the terminal unit. As described in further detail below, the arrangement of the first and second air flow inlets enables improved air flow distribution within the terminal unit, reduced air flow recirculation within the terminal unit, and reduced pressure losses within the terminal unit.

The terminal unit also includes a sound attenuator configured to direct an air flow (e.g., return air, secondary air, etc.) into the terminal unit via one of the air flow inlets. As described below, the sound attenuator may reduce noise generated (e.g., by the air flow) during operation of the terminal unit. Additionally, the terminal unit may include one or more baffles coupled to the sound attenuator and extending through one of the air flow inlets of the terminal unit into an interior volume of the terminal unit. The baffles may enable more even distribution of air flow within the terminal unit. For example, in embodiments of the terminal unit having multiple blowers, the baffles may more evenly distribute the air flow received via the sound attenuator to the multiple blowers. In this way, the sound attenuator and baffles may decrease air flow recirculation and pressure loss within the terminal unit and increase blower efficiency.

Figure 4:
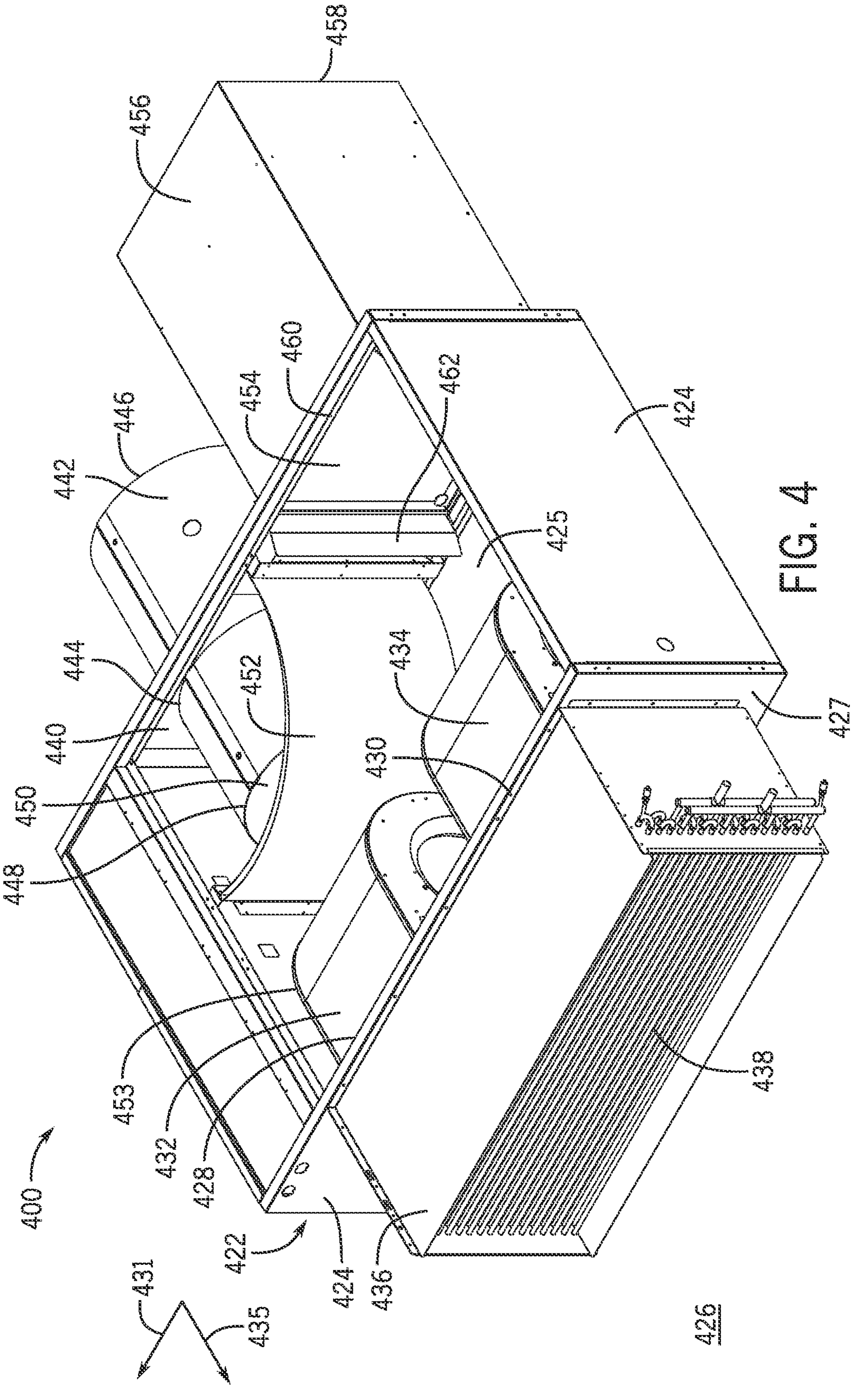
FIG. 4 is a perspective view of an embodiment of a terminal unit of an HVAC system, in accordance with an aspect of the present disclosure.

FIG. 4 is a perspective view of an embodiment of a terminal unit 400, in accordance with the presently disclosed techniques. For example, the terminal unit 400 may be a variable air volume (VAV) terminal unit, such as VAV terminal unit 116, or another suitable terminal unit configured to be used in an HVAC system (e.g., HVAC system 100). As similarly described above, the terminal unit 400 is configured to receive one or more air flows and to discharge the one or more air flows to a conditioned space (e.g., the building 10). The terminal unit 400 may receive air flow from an air handling unit (AHU), such as AHU 106, via ductwork, from the conditioned space, from another air flow source, or any combination thereof. In some embodiments, the terminal unit 400 may condition the received air flows before the air flows are directed to the conditioned space.

In the illustrated embodiment, the terminal unit 400 includes a housing 422 formed from a plurality of panels 424 (e.g., walls, side panels, bottom panel, top panel, etc.). The panels 424 may be fastened to secured to one another to define a plenum 425 (e.g., an interior volume) separate from an external environment 426 in which the terminal unit 400 may be disposed. In certain embodiments, the external environment 426 may be a conditioned space (e.g., within the building 10), an outdoor area, a space above a dropped ceiling, or another suitable location. The panels 424 may include a first panel 427 (e.g., a rear panel) that includes a first outlet opening 428 (e.g., discharge opening) and a second outlet opening 430 (e.g., discharge opening) formed in the first panel 427. In certain embodiments, the first outlet opening 428 may be spaced from the second outlet opening along a direction or axis 431 (e.g., lateral direction or axis). A first blower 432 and a second blower 434 may be disposed within the housing 422. The first blower 432 is fluidly coupled to the first outlet opening 428, and the second blower 434 is fluidly coupled to the second outlet opening 430. The first blower 432 and the second blower 434 are configured to discharge air from the plenum 425 through the first outlet opening 428 and the second outlet opening 430, respectively, along a direction or axis 435 (e.g., an air flow direction or axis). In the illustrated embodiment, the air discharged by the blowers 432 and 434 is directed across a heat exchanger 436 mounted to the first panel 427 of the terminal unit 400. The heat exchanger 436 may include one or more coils 438, which may circulate a working fluid (e.g., heated water, cooled water, etc.) therethrough and enable heat transfer between the working fluid and the air flow discharged by the blowers 432 and 434 to heat or cool the air flow. Thereafter, the air flow may be directed to the conditioned space (e.g., via ductwork). In certain embodiments, the heat exchanger 436 may be disposed within the plenum 425 and condition the air flow before the air flow is discharged from the terminal unit 400 by the blowers 432 and 434. Further, in certain embodiments, the terminal unit 400 may additionally or alternatively include other types of heat exchangers, such as an electric heating coil.

The panels 424 may also include a second panel 440 (e.g., a front panel) disposed opposite the first panel 427 relative to the plenum 425. In other words, the first panel 427 is spaced from the second panel 440 along the direction 435. A duct 442 is coupled to the second panel 440 and extends through a first inlet opening 444 (e.g., primary air inlet) formed in the second panel 440. The duct 442 is configured to direct an air flow (e.g., first air flow, primary air flow) into the plenum 425 of the terminal unit 400. For example, the air flow may be a conditioned or pre-conditioned air flow and/or may be received from the AHU 106 or other air flow source. The duct 442 may have a circular geometry, rectangular geometry, or other suitable shape. The duct 442 may include an inlet portion 446 disposed external to the terminal unit 400 and an outlet portion 448 disposed within the terminal unit 400 (e.g., within the plenum 425). In some embodiments, the inlet portion 446 and the outlet portion 448 are separate components coupled to the second panel 440, and in other embodiments, the inlet and outlet portions 446 and 448 are formed from a single component or piece that extends through the first inlet opening 444 of the second panel 400.

The duct 442 may also include a damper 450 (e.g., valve) coupled or mounted to the outlet portion 448. The damper 450 may be a round or circular damper, a rectangular damper, or other suitable damper. The damper 450 may regulate a flow rate of the air flow directed into the terminal unit 400 via the duct 442. The terminal unit 400 also includes a baffle 452 disposed within the plenum 425 and downstream of the outlet portion 448 of the duct 442. The air flow received by the terminal unit 400 via the duct 442 is directed across the baffle 452. As will be appreciated, the baffle 452 may promote or improve dispersion of the air flow within the plenum 425 and/or may reduce sound generated by the air flow within the terminal unit 400. For example, the baffle 452 may be formed from a mesh structure, a perforated panel, or other porous material or structure. As shown, the baffle 452 may be a curved panel extending from a third panel 453 (e.g., a side panel) to the second panel 440. In other embodiments, the baffle 452 may be formed from one or more generally planar sheets or panels. In some embodiments, the baffle 452 may additionally or alternatively extend from a bottom panel to a top panel of the housing 422. The baffle 452 may be secured (e.g., via mechanical fasteners) to the third panel 453, the second panel 440, the bottom panel, the top panel, another portion of the housing 422, or any combination thereof.

The second panel 440 also includes a second inlet opening 454 formed therein. The second inlet opening 454 may be spaced from the first inlet opening 444 (e.g., return air inlet) along the direction 431. In addition to the air flow received via the first inlet opening 444, the terminal unit 400 may receive another air flow (e.g., a second air flow, return air flow) via the second inlet opening 454. For example, the air flow received via the second inlet opening 454 may be a return air flow received from a space conditioned by the terminal unit 400. In some embodiments, the terminal unit 400 may be disposed above a dropped ceiling (e.g., positioned above a conditioned space), and the air flow may flow from a space above the dropped ceiling and into the terminal unit 400 via the second inlet opening 454.

As mentioned above, the terminal unit 400 further includes a sound attenuator 456 (e.g., silencer) mounted, secured, or otherwise coupled to the housing 422. The sound attenuator 456 is a duct, plenum box, or other conduit coupled to the housing 422 and configured to receive an air flow (e.g., from the external environment 426) and direct the air flow into the plenum 425. To this end, the sound attenuator 456 may include an inlet 458 and an outlet 460, which are fluidly coupled to the second inlet opening 454. The sound attenuator 456 may receive an air flow (e.g., from the external environment 426) via inlet 458 and direct the air flow through the sound attenuator 456 to the outlet 460. From the outlet 460, the air flow is directed into the plenum 425 of the terminal unit 400 via the second inlet opening 454. In operation, the sound attenuator 456 reduces noise generated by the air flow and/or the terminal unit 400 (e.g., the blowers 432 and 434) during operation of the terminal unit 400. The terminal unit 400 may also include one or more baffles 462 coupled (e.g., mounted) to the second panel 440, the sound attenuator 456, or both. For example, the terminal unit 400 may include two baffles 462 disposed on opposite sides (e.g., lateral sides) of the second inlet opening 454. The baffles 462 may extend from the second panel 440 and into the plenum 425. The baffles 462 may enable more even air flow distribution within the terminal unit 400, which may improve operation of the terminal unit 400, as described in further detail below.

Figure 5:
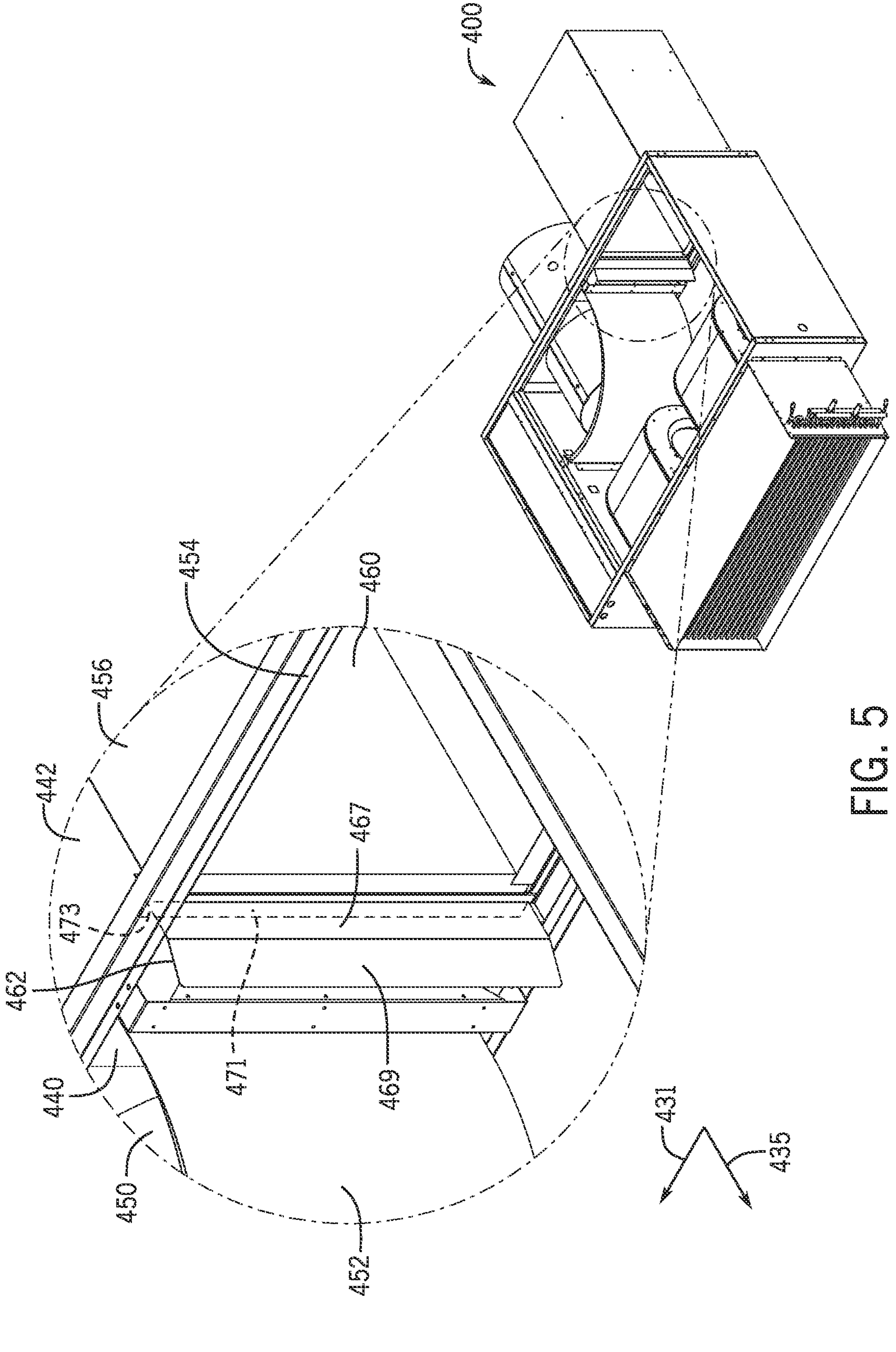
FIG. 5 is an expanded perspective view of an embodiment of a baffle mounted to a terminal unit, in accordance with an aspect of the present disclosure.

FIG. 5 is an expanded perspective schematic view of an embodiment of one of the baffles 462 of the terminal unit 400. As shown, the baffle 462 is disposed on a first side (e.g., lateral side, vertically-extending side) of the second inlet opening 454. Another baffle 462 may be disposed on a second side (e.g., lateral side, vertically-extending side) of the second inlet opening 454, as discussed below. In certain embodiments, the terminal unit 400 may only include a baffle 462 disposed on the first side of the second inlet opening 454 (e.g., a lateral side opposite a side panel of side panels 479). The baffle 462 of the illustrated embodiment is coupled to the second panel 440 and includes a first portion 467 (e.g., panel, sheet, segment, etc.) generally extending from the second panel 440 in the direction 435. For example, the first portion 467 may be generally aligned with the first side (e.g., lateral side, vertically-extending side) of the sound attenuator 456. The first portion 467 may extend from the second panel 440 and into the plenum 425 by any suitable distance, such as between approximately one and three inches. The baffle 462 also includes a second portion 469 extending from the first portion 467 at an angle relative to the first portion 467. More specifically, the second portion 467 extends from the first portion 467 in a laterally outward direction (e.g., relative to the second inlet opening 454, in the direction 431, relative to the sound attenuator 456, etc.). As discussed further below, the angled arrangement of the first portion 467 and the second portion 469 enables improved distribution of the air flow received via the second inlet opening 454 within the plenum 425. For example, the baffle 462 may function as a diffuser that more evenly distributes the air flow directed to the first and second blowers 432 and 434. The second portion 469 may extend from the first portion 467 by any suitable distance, such as between approximately one to three inches. In some embodiments, a total distance by which the baffle 462 extends from the second panel 440 may be between approximately three and five inches.

The baffle 462 further includes a third portion 471 (e.g., a flange) extending crosswise from the first portion 467, for example, along the direction 431. The third portion 471 may enable securement of the baffle 462 to the second panel 440, to a flange or surface of the sound attenuator 456, or both.

In some embodiments, the first portion 467, the second portion 469, and the third portion 471 may be formed from a single piece of material, such as sheet metal. In the illustrated embodiment, the baffle 462 is secured or mounted to the rear panel 440 fasteners 473 (e.g., rivets, bolts, etc.) that may extend through corresponding holes or apertures formed in the third portion 471 and the second panel 440. However, the baffle 462 may be secured to the housing 422 and/or the sound attenuator 456 in any other suitable manner.

Figure 6:
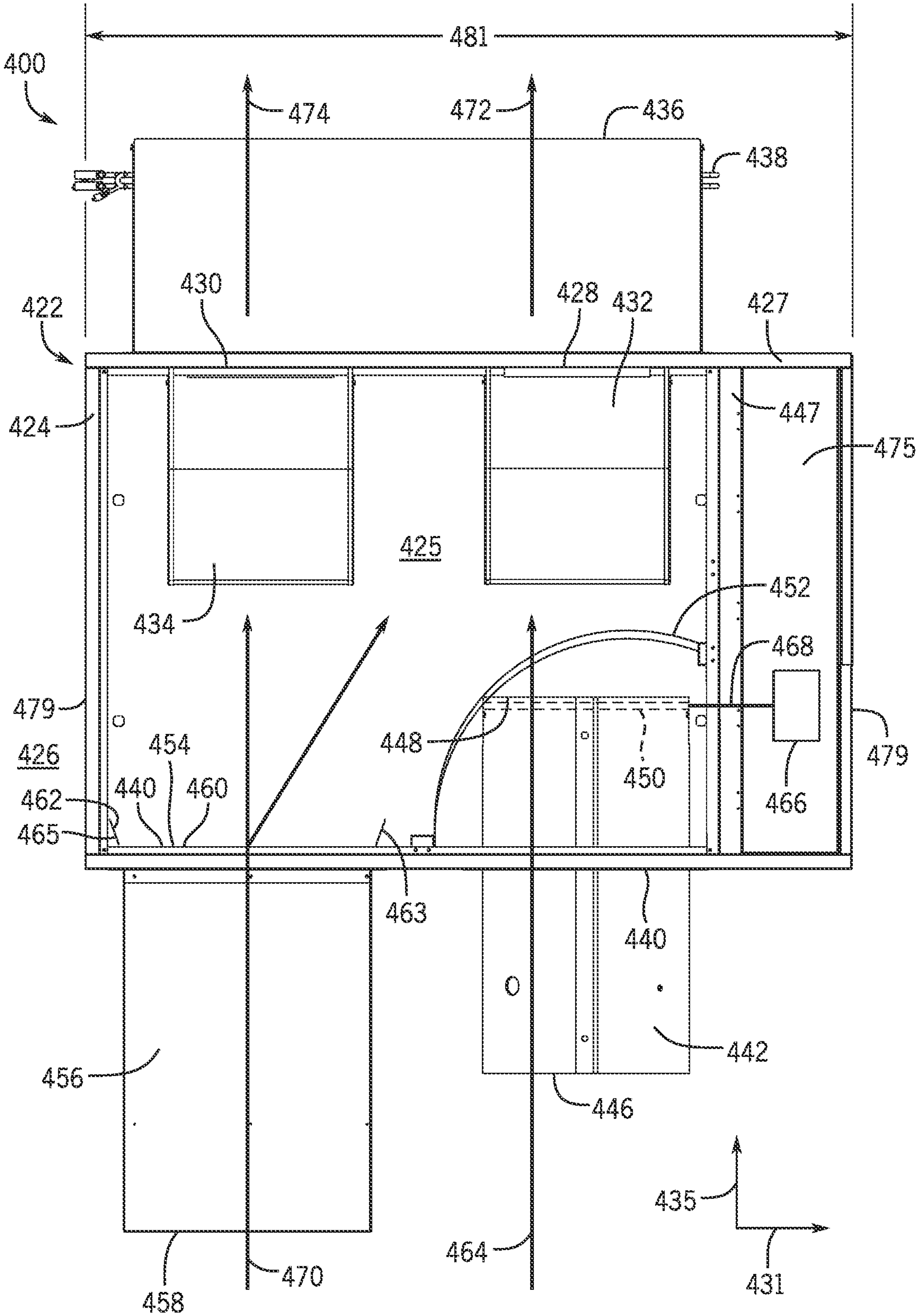
FIG. 6 is a top view of an embodiment of a terminal unit of an HVAC system, illustrating air flow through the terminal unit, in accordance with an aspect of the present disclosure.

FIG. 6 is a top view of an embodiment of the terminal unit 400, illustrating air flow through the terminal unit 400. The terminal unit 400 may receive a first inlet air flow 464 (e.g., first air flow) from the duct 442 via the first inlet opening 444. The first inlet air flow 464 may be a primary (e.g., fresh, conditioned, etc.) air flow provided from an exterior source. For example, the first inlet air flow 464 may be provided by the AHU 106, another component of the HVAC system 100, an outdoor environment, or another suitable source. A flow rate of the first inlet air flow 464 received by the terminal unit 400 may be regulated by the damper 450, as described above. To this end, the terminal unit 400 may include an actuator 466 configured to regulate operation of the damper 450 via a shaft 468 extending between the damper 450 and the actuator 466. In the illustrated embodiment, the actuator 466 is positioned in a compartment 475 within the housing 422. The compartment 475 is separated from the plenum 425 by an internal panel 477 extending from the first panel 427 to the second panel 440. The internal panel 477 may also extend between top and bottom panels of the housing 422, such that the plenum 425 and the compartment 475 are fluidly separate from one another. The shaft 468 may extend from the duct 442, through the internal panel 477, and to the actuator 466. In particular, the shaft 468 extends from the duct 442 in a direction opposite the first inlet opening 444 and the second inlet opening 454 (e.g., along direction or axis 431). As will be appreciated, the arrangement of the first inlet opening 444 and the second inlet opening 454 on the second panel 440 enables a reduction in a length of the shaft 468 extending from the damper 450 to the actuator 466 and also enables positioning of the actuator 466 in the compartment 475 instead of the plenum 425. Thus, the shaft 468 and the actuator 466 may be substantially removed from a flow path of the first inlet air flow 464, thereby reducing interference and/or noise generation that may otherwise be induced by the shaft 468 and/or the actuator 466. The actuator 466 may be mounted to the housing 422 and/or the internal panel 477 (e.g., via rivets, bolts, etc.). In other embodiments, the actuator 466 may be disposed external to the housing 422.

The terminal unit 400 may also receive a second inlet air flow 470 (e.g., second air flow) via the second inlet opening 454 and the sound attenuator 456. For example, the second inlet air flow 470 may be a return air flow received from a conditioned space. For example, the second inlet air flow 470 may be received by the sound attenuator 456 from a space above a dropped ceiling of the conditioned space in which the terminal unit 400 is disposed or from a return duct fluidly coupled to the conditioned space. During operation, the second inlet air flow 470 may flow through the sound attenuator 456, past the baffles 462, and into the plenum 425. The baffles 462 may promote and/or enable more even distribution of the second inlet air flow 470 between the first blower 432 and the second blower 434, as shown. For example, the baffles 462 includes a first baffle 463 and a second baffle 465 positioned on opposite sides (e.g., lateral sides) of the second inlet opening 454 and extending into the plenum 425. The first and second baffles 463 and 465 may function as a diffuser that disperses the second inlet air flow 470 within the plenum 425. To this end, the first and second baffles 463 and 465 each include the second portion 469 extending from the first portion 467 at an angle (e.g., outward angle) laterally away from the second inlet opening 454 (e.g., along axis 131).

As mentioned above, the arrangement of the first inlet opening 444 and the second inlet opening 454 on the second panel 440 (e.g., instead of side panels 479 of the housing 422) also enables improved air flow into and through the terminal unit 400. For example, the first inlet air flow 464 and the second inlet air flow 470 both flow into the terminal unit 400 in the direction 435 towards the first and second blowers 432 and 434. Thus, impingement of the first inlet air flow 464 and the second inlet air flow 470 against the panels 424 of the housing 422 is reduced, pressure losses within the terminal unit 400 are reduced, and formation of air flow recirculation zones in the terminal unit 400 are reduced. As a result, the first and second blowers 432 and 434 may operate at reduced speeds and consume less power while discharging air from the terminal unit 400 at a desired flow rate, which decreases noise generated by the first and second blowers 432 and 434 and also increases the efficiency of the terminal unit 400.

Within the plenum 425, the second inlet air flow 470 may mix with the first inlet air flow 464. The mixed air flows may be drawn by the first and second blowers 432 and 434, which discharge the air flows from the terminal unit 400. Specifically, the first blower 432 may discharge a first outlet air flow 472, and the second blower 434 may discharge a second outlet air flow 474.

While the presently disclosed embodiments enable improved operation of the terminal unit 400 in the manner described above, the present techniques also enable improved installation, packaging, and transportation of the terminal unit 400. For example, the arrangement of the first inlet opening 444 and the second inlet opening 454 on the second panel 440 (e.g., instead of the side panels 479 of the housing 422) enables a reduction in an overall width 481 of the terminal unit 400. Thus, installation and/or placement of the terminal unit 400 in a wider variety of locations is enabled. In other words, flexibility with installation of the terminal unit 400 is improved.

Figure 7:
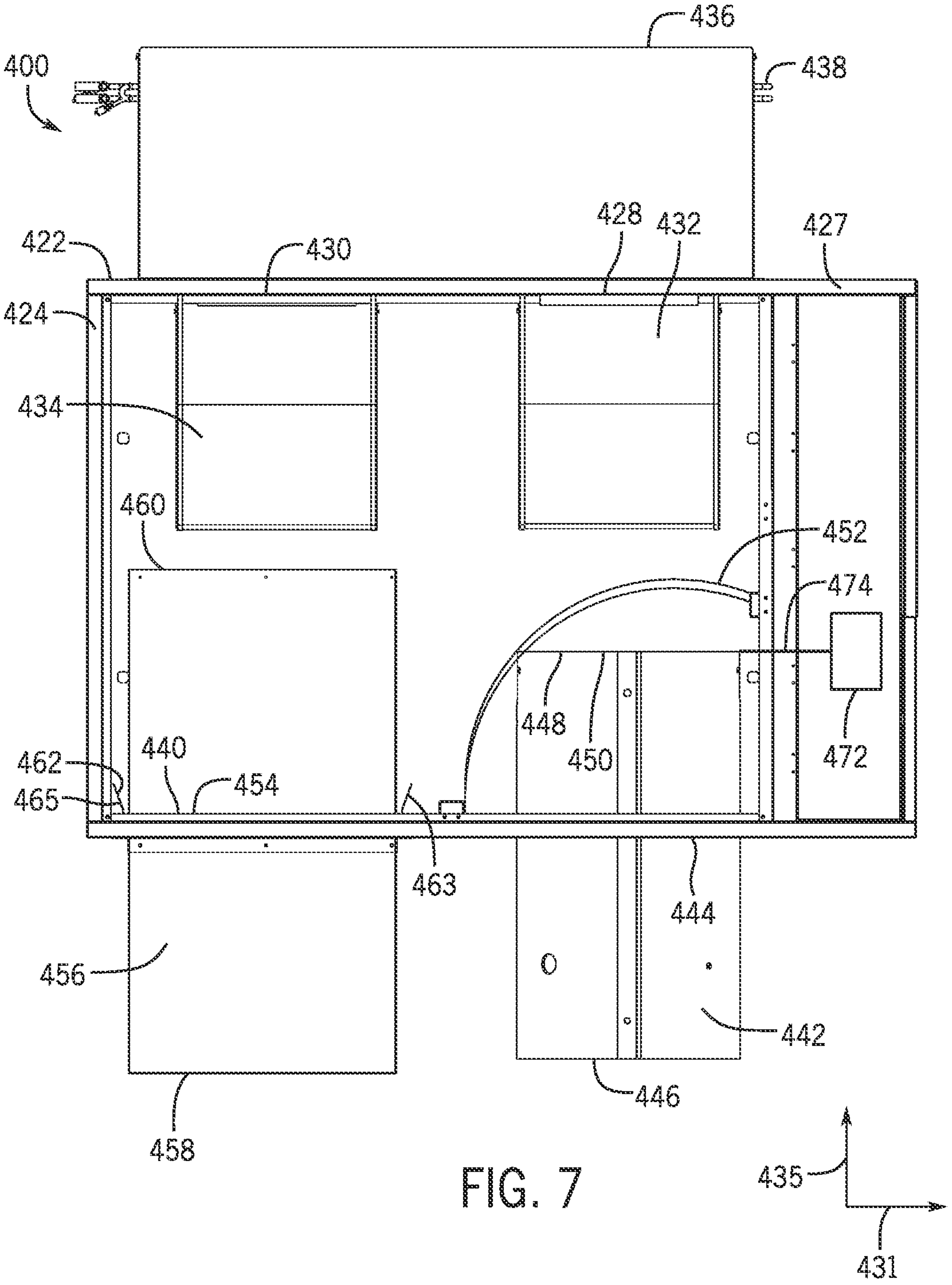
FIG. 7 is a top view of an embodiment of a terminal unit of an HVAC system, illustrating a retracted configuration of a sound attenuator of the terminal unit, in accordance with an aspect of the present disclosure.

As a further example, FIG. 7 is a top view of an embodiment of the terminal unit 400, illustrating a retracted configuration of the sound attenuator 456 with the terminal unit 400. During, for example, packaging, storage, or transportation (e.g., shipping), the terminal unit 400 may be arranged in the retracted configuration in which the sound attenuator 456 is partially disposed within the plenum 425. The sound attenuator 456 may be translatable into the plenum 425 via the second inlet opening 454. For example, the sound attenuator 456 may have a geometry that is similar and/or corresponds to a geometry of the second inlet opening 454 with slightly reduced dimensions. Thus, the sound attenuator 456 may translate within the second inlet opening 454 and be at least partially retained and/or secured within the second inlet opening 454 (e.g., by the second panel 440). In the retracted configuration (e.g., a collapsed configuration), the sound attenuator 456 may be further secured to the terminal unit 400, such as via mechanical fasteners extending through holes formed in the sound attenuator 456 and the terminal unit 400. For example, the sound attenuator 456 and/or the terminal unit 400 (e.g., the second panel 440) may include one or more flanges having holes configured to receive mechanical fasteners to secure the sound attenuator 456 to the terminal unit 400 in a desired position (e.g., in the retracted configuration). The sound attenuator 456 may be similarly secured to the terminal unit 400 via mechanical fasteners (e.g., via holes formed in one or more flanges of the sound attenuator 456 and/or terminal unit 400) in an installed or operating configuration in which the sound attenuator 456 is disposed external to the housing 422 (FIG. 6). As shown, the baffles 462 may be secured to the second panel 440 in a fixed position when the sound attenuator 456 is in both the retracted configuration and in the installed configuration.

Figure 8:
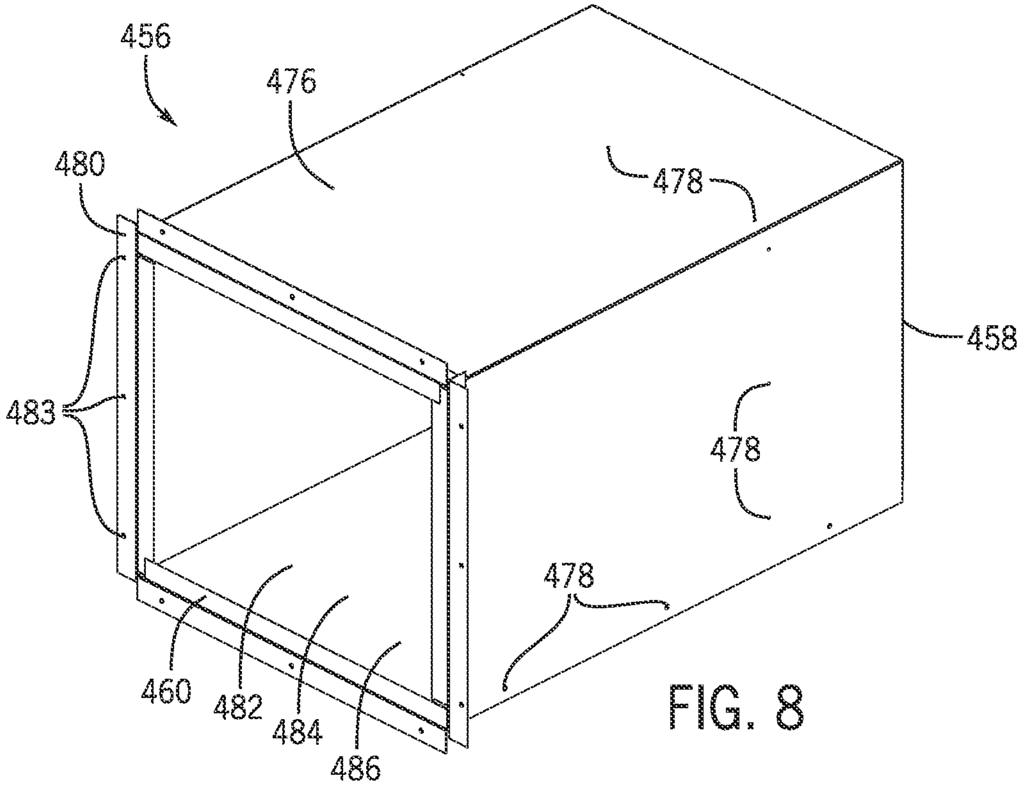
FIG. 8 is a perspective view of an embodiment of a sound attenuator for a terminal unit, in accordance with an aspect of the present disclosure.

FIG. 8 is a front perspective view of an embodiment of the sound attenuator 456. The sound attenuator 456 may generally be defined by a sound attenuator housing 476 (e.g., conduit, plenum box, sleeve, etc.). For example, in the illustrated embodiment, the sound attenuator housing 476 has a generally rectangular configuration formed by one or more panels that define the inlet 458, the outlet 460, and an interior volume 482 (e.g., flow path) of the sound attenuator 456. Other embodiments of the sound attenuator 456 may have other geometries or configurations (e.g., circular, triangular, etc.). The sound attenuator housing 476 may include a plurality of holes (e.g., apertures) 478 formed therein. The holes 478 may be used to secure the sound attenuator 456 to the terminal unit 400 via flanges 480 (e.g., flange brackets, L brackets, etc.). For example, the flanges 480 may be secured to the second panel 440 via mechanical fasteners extending through holes 483 formed in flanges 480 and corresponding holes formed in the second panel 440. However, in other embodiments, the flanges 480 may be integrally formed with the housing 422 of the terminal unit 400 or may be separate components secured to the sound attenuator housing 476 and to the housing 422. Mechanical fasteners (e.g., bolts, rivets, etc.) may also be used to secure the sound attenuator housing 476 to the flanges 480 via the holes 478 formed in the sound attenuator housing 476. A subset of the holes 478 may be formed in the sound attenuator housing 476 near the outlet 460 for securement of the sound attenuator 456 to the flanges 480 in an installed configuration of the sound attenuator 456. Another subset of the holes 478 may formed near a center or other area of the sound attenuator housing 476 for securement of the sound attenuator 456 to the flanges 480 in a storage or retracted configuration of the sound attenuator 456. In other words, in the retracted configuration, the sound attenuator housing 476 may be at least partially disposed within the plenum 425 of the housing 422, and mechanical fasteners may be used to secure the sound attenuator 456 to the flanges 480 via a subset of the holes 478 formed in the sound attenuator housing 476.

As mentioned above, the interior volume 482 may be generally defined by the sound attenuator housing 476. As shown, the sound attenuator housing 476 has an interior surface 484. The interior attenuator surface 484 may be lined with an insulation layer 486. As examples, the insulation layer 486 may be formed from fiberglass (e.g., dual density fiberglass), foam, rubber, or other suitable insulating material. The insulation layer 486 may be secured to the interior surface 484 via an adhesive, pin welding, or other suitable manner. The insulation layer 486 may reduce noise produced by the second inlet air flow 470 and/or reduce transmission of noise generated by the terminal unit 400 (e.g., the first and second blowers 432 and 434) during operation.

Figure 9:
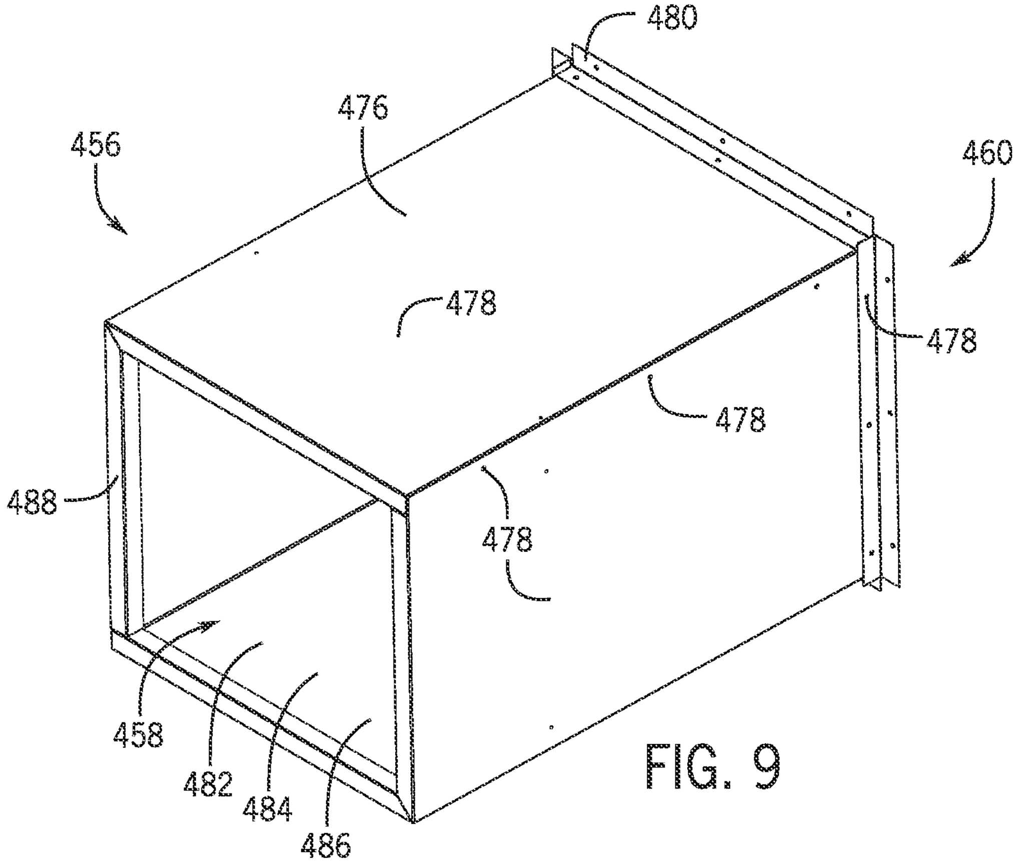
FIG. 9 is a perspective view of an embodiment of a sound attenuator for a terminal unit, in accordance with an aspect of the present disclosure.

FIG. 9 is a rear perspective view of an embodiment of the sound attenuator 456, illustrating the sound attenuator housing 476 and the holes 478 formed in the sound attenuator housing 476 for use in securing the sound attenuator 456 to the terminal unit 400 in the installed configuration and the retracted configuration discussed above. As shown in the illustrated embodiment, the sound attenuator housing 476 may also include inlet flanges 488 extending inward (e.g., toward the interior volume 482) at the inlet 458. The inlet flanges 488 may be utilized to secure the insulation layer 486 within the interior volume 482. In certain embodiments, the sound attenuator 456 may be secured to ductwork or another suitable structure via the inlet flanges 488. However, in other embodiments, the sound attenuator 456 may not be secured to additional ductwork via the inlet flanges 488, and the inlet 458 may remain exposed to external environment 426 surrounding the terminal unit 400.

Figure 10:
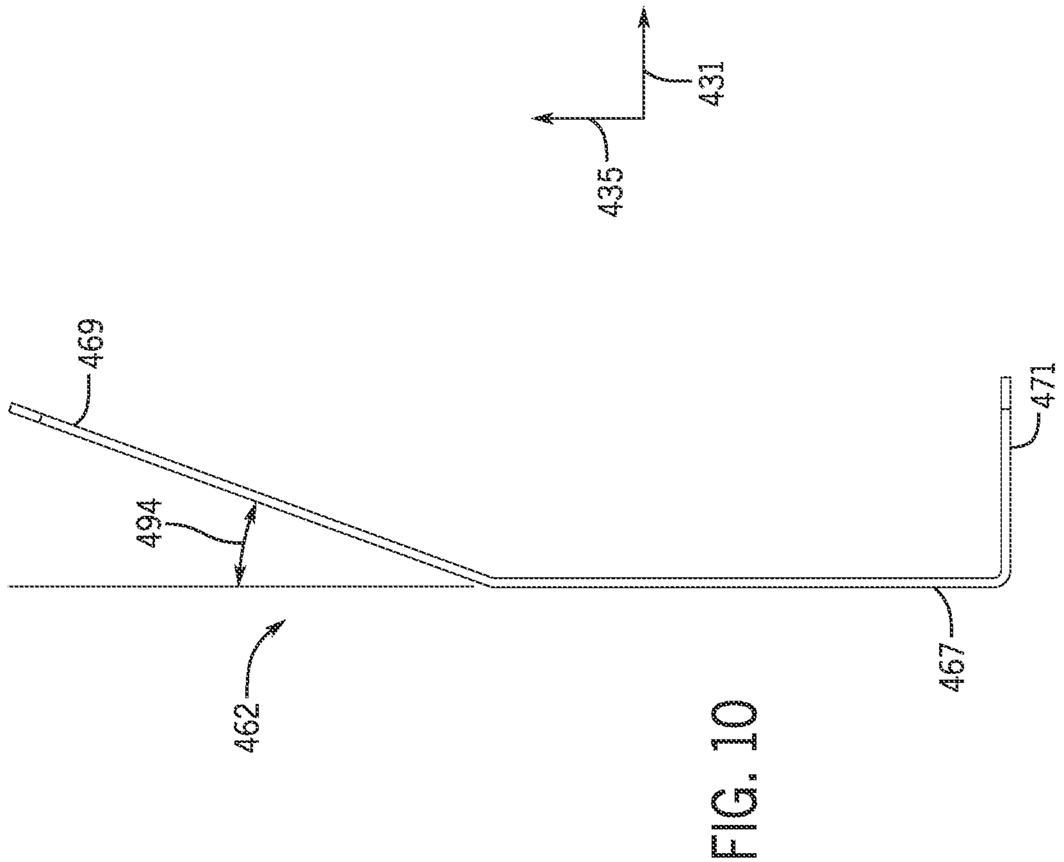
FIG. 10 is a top view schematic of an embodiment of a baffle for a terminal unit having a sound attenuator, in accordance with an aspect of the present disclosure.

FIG. 10 is a top view schematic of an embodiment of the baffle 462 for the terminal unit 400. As discussed above, the baffle 462 may include the first portion 467, the second portion 469, and the third portion 471. In an installed configuration of the baffle 462 with the terminal unit 400, the third portion 471 may be secured to the second panel 440 at a lateral side of the second inlet opening 454. Thus, the first portion 467 may extend from the rear panel 440 and into the plenum 425 in the direction 435. The second portion 469 may extend from the first portion 467 at an angle 494 (e.g., relative to the direction or axis 435). The angle 494 may be between approximately 15 degrees and 30 degrees or between approximately 20 degrees and 25 degrees, in certain embodiments. In some embodiments, the baffle 462 (e.g., the third portion 471) may be secured to the sound attenuator 456 and/or to the flanges 480 (e.g., via rivets, bolts, etc.) discussed above.

Figure 11:
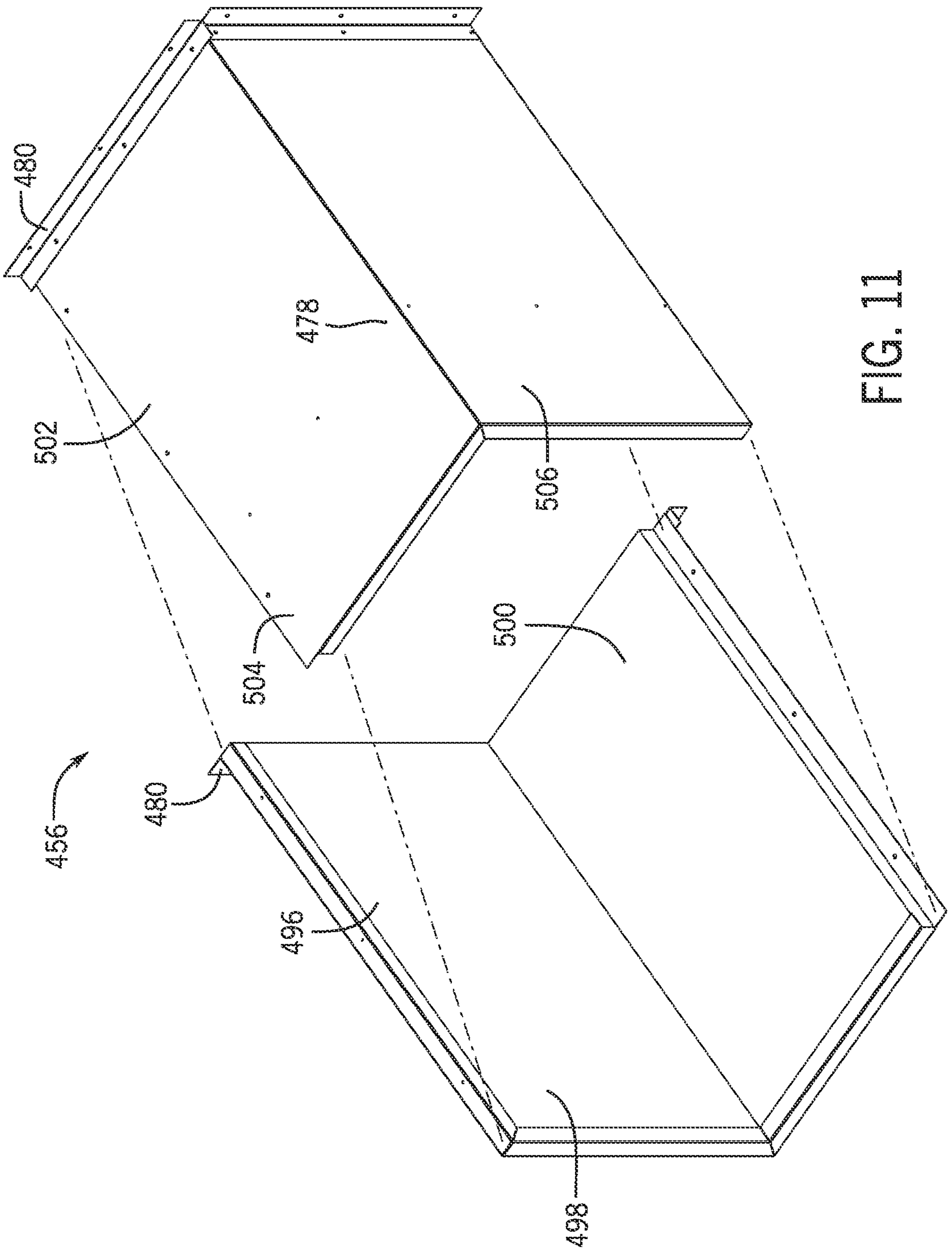
FIG. 11 is an exploded perspective view of an embodiment of a sound attenuator for a terminal unit, illustrating a disassembled configuration of the sound attenuator, in accordance with an aspect of the present disclosure.

FIG. 11 is an exploded perspective view of an embodiment of a sound attenuator 456, illustrating a disassembled configuration of the sound attenuator 456. In the illustrated embodiment, the sound attenuator housing 476 is formed from two pieces (e.g., housing sections, body portions, etc.), which may have similar configurations. As shown, a first housing section 496 (e.g., body portion, L-shaped section) may include a first panel 498 and a second panel 500. The first panel 498 may extend crosswise (e.g., generally perpendicularly) from the second panel 500. In certain embodiments, the first housing section 496 is formed from a single piece of material, such as sheet metal. In other embodiments, the first and second panels 498 and 500 may be separate panels that are attached to one another via fasteners, brazes, or other securement mechanism. A second housing section 502 may include a third panel 504 and a fourth panel 506. The third panel 504 may extend crosswise (e.g., generally perpendicularly) from the fourth panel 506. In certain embodiments, the second housing section 502 is formed from a single piece of material, such as sheet metal. In other embodiments, the third and fourth panels 504 and 506 are separate panels that are attached to one another via fasteners, brazes, or other securement mechanism.

In some embodiments, the first housing section 496 and the second housing section 502 may have similar (e.g., identical) configurations, which may facilitate efficient manufacturing of the sound attenuator 456 at reduced cost. The first and second housing sections 496 and 502 may be coupled to one another to form the sound attenuator housing 476 defining the inlet 458, the outlet 460, and the interior volume 482 via brazing, welding, mechanical fasteners, or another suitable technique. In certain other embodiments, the first panel 498, the second panel 500, the third panel 504, and the fourth panel 506 may be formed from a single piece of material, such as sheet metal. Additionally, the insulation layer 486 may be installed to the interior surface 484 of the sound attenuator housing 476 before or after the first housing section 496 and the second housing section 502 are secured to one another. As shown, the flanges 480 may be secured to the first housing section 496 and the second housing section 502 to facilitate securement of the sound attenuator 456 to the housing 422 of the terminal unit 400.

As set forth above, embodiments of the present disclosure may provide one or more technical effects useful for reducing noise and increasing efficiency in a terminal unit. Specifically, embodiments are directed to a sound attenuator disposed opposite two blowers in a terminal unit. For example, the sound attenuator may be secured to a panel having a first inlet opening configured to direct a first air flow into the terminal unit and having a second inlet opening configured to direct a second air flow into the terminal unit. The sound attenuator may be secured to the panel about the second inlet opening and may direct the second air flow into the terminal unit via the second inlet opening. As discussed above, the sound attenuator disclosed herein is configured to more evenly distribute the second air flow (e.g., return air flow) to multiple blowers of the terminal unit. In this way, the disclosed embodiments enable improved operation and reduced noise generated by the terminal unit. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A terminal unit for a heating, ventilation, and air conditioning (HVAC) system, comprising:

a housing defining a plenum;

a panel of the housing, wherein the panel comprises a first inlet opening configured to receive a first air flow and a second inlet opening configured to receive a second air flow;

a baffle coupled to the panel at the first inlet opening and extending into the plenum; and a sound attenuator coupled to the panel, wherein the sound attenuator comprises an inlet configured to receive the first air flow in a first direction and an outlet configured to discharge the first air flow in the first direction and into the housing via the first inlet opening, wherein the sound attenuator is translatable relative to the baffle and into the plenum via the first inlet opening.

2. The terminal unit of claim 1, wherein the baffle comprises:

a first portion extending from the panel; and a second portion extending from the first portion, wherein the second portion is disposed at an angle relative to the first portion.

3. The terminal unit of claim 2, wherein the second portion extends laterally outward from the first portion, relative to the first inlet opening.

4. The terminal unit of claim 3, wherein the angle is between 20 degrees and 25 degrees.

5. The terminal unit of claim 2, wherein the baffle is a first baffle, the terminal unit comprises a second baffle coupled to the panel at the first inlet opening, and the first baffle and the second baffle are disposed opposite one another relative to the first inlet opening.

6. The terminal unit of claim 1, wherein the panel is a first panel, the terminal unit comprises a second panel of the housing, and the second panel comprises an outlet opening configured to discharge air from the housing.

7. The terminal unit of claim 6, wherein the outlet opening is a first outlet opening, the second panel comprises a second outlet opening, and the second outlet opening is configured to discharge air from the housing.

8. The terminal unit of claim 7, wherein the first outlet opening and the second outlet opening are each configured to discharge air from the housing in the first direction.

9. The terminal unit of claim 6, wherein the second panel is disposed opposite the first panel, relative to the plenum, the terminal unit comprises a side panel of the housing extending from the first panel to the second panel, and the baffle is coupled to the first panel on a lateral side of the first inlet opening opposite the side panel of the housing.

10. The terminal unit of claim 1, comprising:

a duct coupled to the panel, wherein the duct is configured to direct the second air flow through the second inlet opening and into the plenum in the first direction; and a baffle panel disposed within the housing and downstream of the duct, wherein the duct is configured to direct the second air flow through the baffle.

11. The terminal unit of claim 10, comprising:

a damper coupled to the duct and configured to regulate the second air flow directed into the plenum;

an actuator coupled to the housing and configured to regulate operation of the damper; and a shaft coupled to the damper and to the actuator, wherein the actuator is disposed external to the housing.

12. A terminal unit for a heating, ventilation, and air conditioning (HVAC) system, comprising:

a housing defining a plenum, wherein the housing comprises a first panel and a second panel, the first panel comprises a first inlet opening configured to receive a first air flow and a second inlet opening configured to receive a second air flow, and the second panel comprises an outlet opening configured to discharge air from the housing;

a baffle coupled to the first panel at the first inlet opening and extending into the plenum, wherein the baffle comprises a first portion and a second portion, the first portion extends from the first panel, and the second portion extends from the first portion at an oblique angle relative to the first portion; and a sound attenuator configured to couple to the first panel and to direct the first air flow into the plenum via the first inlet opening, wherein the sound attenuator is configured to translate relative to the baffle and into the plenum via the first inlet opening.

13. The terminal unit of claim 12, wherein the baffle is a first baffle, the first baffle is coupled to the first panel on a first side of the first inlet opening, and the terminal unit comprises a second baffle coupled to the first panel on a second side of the first inlet opening, opposite the first side, and extending into the plenum.

14. The terminal unit of claim 13, wherein the second baffle comprises a third portion extending from the first panel and a fourth portion extending from the third portion at an angle relative to the third portion, and wherein the second portion of the first baffle and the fourth portion of the second baffle extend away from one another.

15. The terminal unit of claim 12, wherein the outlet opening is a first outlet opening, the second panel comprises a second outlet opening configured to discharge air from the housing, the first inlet opening is configured to receive the first air flow in a first direction, the second inlet opening is configured to receive the second air flow in the first direction, and the first outlet opening and the second outlet opening are configured to discharge air from the housing in the first direction.

16. The terminal unit of claim 15, comprising:

a first blower disposed within the housing and configured to discharge air from the housing via the first outlet opening in the first direction; and a second blower disposed within the housing and configured to discharge air from the housing via the second outlet opening in the first direction.

17. The terminal unit of claim 16, comprising a heat exchanger coupled to the second panel on a side of the second panel opposite the first blower and the second blower, wherein the first blower and the second blower are configured to direct air across the heat exchanger.

18. A terminal unit for a heating, ventilation, and air conditioning (HVAC) system, comprising:

a housing defining a plenum;

a first panel of the housing, wherein the first panel comprises a first inlet opening configured to receive a first air flow and a second inlet opening configured to receive a second air flow;

a second panel of the housing disposed opposite the first panel, relative to the plenum, wherein the second panel comprises a first outlet opening configured to discharge air from the housing and a second outlet opening configured to discharge air from the housing;

a first baffle coupled to the first panel at the first inlet opening and extending into the plenum;

a second baffle coupled to the first panel at the first inlet opening and extending into the plenum, wherein the first baffle and the second baffle each comprise a first portion extending from the first panel and a second portion extending from the first portion, wherein the second portion is disposed at an angle relative to the first portion; and a sound attenuator configured to couple to the first panel, extend at least partially into the housing, and direct the first air flow into the plenum via the first inlet opening.

19. The terminal unit of claim 18, wherein the sound attenuator is configured to translate relative to the first panel, the first baffle, and the second baffle to extend into the plenum via the first inlet opening.

20. The terminal unit of claim 19, wherein, in an installed configuration, the sound attenuator is secured to flanges of the first panel and is disposed external to the housing, and wherein, in a collapsed configuration, the sound attenuator is secured to the flanges and is disposed at least partially within the housing.

* * * * *